April 10, 1934.    U. KÖLM    1,954,054
BALANCE PRINTER SELECTING DEVICE
Filed June 16, 1928    3 Sheets-Sheet 1

FIG. I.

April 10, 1934.  U. KÖLM  1,954,054
BALANCE PRINTER SELECTING DEVICE
Filed June 16, 1928    3 Sheets-Sheet 3

Inventor
Ulrich Kölm
By his Attorney
W. M. Wilson

Patented Apr. 10, 1934

1,954,054

UNITED STATES PATENT OFFICE 1,954,054

BALANCE PRINTER SELECTING DEVICE

Ulrich Kölm, Berlin, Germany, assignor, by mesne assignments, to International Business Machines Corporation, New York, N. Y., a corporation of New York Application June 16, 1928, Serial No. 285,934
In Germany October 8, 1927

18 Claims. (Cl. 235—92)

The invention concerns subtracting tabulating machines having a plurality of accumulators and has for its principal object the provision of new and improved mechanism for selecting the true balance for printing on such machines.

A well known type of subtracting tabulator such as disclosed for example, in the U. S. Patent No. 1,791,953, February 10, 1931, effects subtraction by entering true values of one class of items, such as credit items, into an accumulator and the complementary values of another class of items, such as debit items, into the same accumulator. After a number of promiscuous debit and credit items have been entered into the accumulator in their true and complementary values respectively, the accumulator will indicate a true balance if the aggregate value of credit items predominates and a complementary balance if the aggregate value of the debit items predominates. The controlling cards for this patented machine are perforated for both classes of items in their true value and as they pass through the machine, effect entry of credit items in their true values into a credit balance accumulator and into a debit balance accumulator in their complementary values. Conversely, the debit items are entered into the credit balance accumulator in their complementary value and into the debit balance accumulator in their true value. At the end of a card run, if the balance is a credit one, it will appear on the credit balance accumulator in its true value and on the debit balance accumulator in its complementary value. On the contrary, if the resultant balance is a debit one, its true value will appear on the debit balance accumulator and its complementary value on the credit balance accumulator. In either case printing is desired only of the true balance whether it be debit or credit.

There is, therefore, selected for printing that accumulator which shows a true balance. The complementary balance is indicated by the presence of nines on the counter wheels to the left of the bank beyond the significant figures of the complement, while a true balance is indicated by the presence of zeros on these wheels. It is customary to feel out the extreme left hand wheel of one accumulator to determine whether it indicates a zero or a nine and to select the accumulators for printing accordingly. This requires that at least one of the balance accumulators be provided with an extra counter wheel to permit this feeling out operation, as the wheel which is felt out must always register either nine or zero, and therefore cannot be used to indicate a significant figure of the balance. In other words, the capacity of the accumulator must be decreased by one counter wheel to permit of its use as a balance accumulator in this operation.

One object of the present invention is to provide mechanism in which the full counter capacity of accumulators may be used for significant figures of the balance, while nevertheless the proper printing selection may be made.

Another object is to provide mechanism under card control for selecting a balance accumulator for printing.

Still another object is to provide a mechanism in which the transfer mechanism of a balance accumulator is used to select the accumulator for printing.

The method of carrying out the invention will now be briefly explained. When balances are obtained by complementary addition in which items of one class are entered in their actual value and those of another class in their complementary value, it is clear that a change in the type of balance, that is a change from a credit to a debit balance or vice versa, can only occur when an item of the class to which the balance changes is added. If the credit items are entered according to their positive value and the debit items according to their complementary value and a credit balance stands on the accumulator at any time, it can only be changed into a debit balance if a debit entry is made. That is, if at any time a balance accumulator shows a true balance this can only be changed into a complementary balance by the addition of a complementary item. This will be clearer from a specific example. If a credit balance designated by 160 stands on the accumulator, and a debit item amounting to 270 is entered in its complementary value represented by 9730, the character of the balance would be changed thus:

Credit balance_____ 160
Complement of debit item 270_____ 9730

Resulting in a debit balance (complementary) of_____ 9890

It is obvious that in such a case the printer selection may be made direct from the record, that is if a record bearing a debit item is provided with a designating perforation which controls the translation of the data into its complementary value, this same designating perforation could be used to select the printing mechanism to select one of the balance counters for balance printing. In another case, if a credit balance stands on the accumulator and a debit item of smaller value is complementarily added, the character of the balance does not change thus:

Credit balance _____ 160
Complement of debit item 29 _____ 9971

Resulting in a balance of _____ 0131

It will be noted that at the end of the actual entry of the complement the counter elements to the left of the significant figure in this case stand at 0 and that the nines were disposed of through a transferring operation which takes place in the latter part of the machine cycle after the actual entries.

According to the preceding scheme the entry of the debit item would select temporarily the debit balance accumulator for printing but it is proposed to use this transferring operation on the extreme left hand counter wheel through which the 9 entered from a debit item (complementary) is disposed of to reselect the credit balance accumulator for printing. Now assume that the true balance at a given time is a debit one, so that if a balance is printed at this time it should be printed from the debit balance accumulator. If the next item entered is a credit one larger than the previous debit balance the selection for printing should shift to the credit balance accumulator. The credit card has no designating perforation so that there can be no shifting from the card control but the entry of the larger credit results in a transferring operation which as before may select the other or credit balance accumulator. This may be represented as it affects the credit balance accumulator thus:

Debit balance (complement of 29) _____ 9971
Credit item (true value) _____ 120

Resulting in a balance of _____ 0091 and effecting a transfer.

The last case is that in which the balance at a given time is a debit one, the debit balance accumulator being selected for printing control, and another debit item is added. In this case the debit card has a designating perforation and it is proposed that this as before shift the printing connections so that, from the card itself the printing connections will be shifted to the credit balance accumulator. The resulting transfer, however, again shifts the printing connections to their former condition so that at the end of the operation the debit balance accumulator is ultimately selected. This affects the credit balance accumulator thus:

Debit balance (complement of 29) _____ 9971
Debit item (complementary value of 35) ___ 9965

Resulting in complementary balance of ____ 9936 and effecting a transfer.

The system may be briefly summarized as follows: an entry of one type of item (for example a debit item) shifts the printing connections from the balance accumulator which is then controlling to the other; a transferring operation after, and as a result of, an entry shifts the printing connections from the balance accumulator which is controlling just prior to the transfer to the other. In other words the printing connections are ultimately shifted as a result of any entry which involves either a debit item or a transfer operation on the extreme left hand accumulator wheel but the printing connections are not ultimately shifted as a result of any entry which involves both a debit item and a transfer operation. The operation of the device will be made clearer by tracing the operation through a plurality of steps during which the several selections are made.

| Kind of item | Amount of item | Transfer | Indication on the credit balance accumulator |
|---|---|---|---|
| 1. Credit | 270 | | 0270 |
| 2. Credit | 110 | | 0380 |
| 3. Debit | 110 | (1) | 270 |
| 4. Debit | 110 | (1) | 160 |
| 5. Debit | 270 | | 9890 |
| 6. Debit | 270 | (1) | 9620 |

Assume that each debit item card has a special perforation designating it as such and that the credit item cards have no such special perforations.

The first card carrying a credit item, and therefore having no special designating perforation, enters this item in its true value into the credit balance accumulator. The second card likewise carries a credit item and therefore has no special designating perforation. As neither of these cards has a special designating perforation to select the debit balance accumulator and no transferring operation is involved on the left hand counter wheel, if it is assumed that the credit balance accumulator is normally in condition to print, this condition will not be disturbed. The third card carries a debit item whose value, however, is too small to change the character of the balance. In this case the designating perforation on the debit card momentarily selects the debit balance accumulator for printing but the transferring operation, clearing the counter wheels to the left of the first significant figure reselects the credit balance accumulator for printing so that at the end of the entry the credit balance accumulator still remains in condition for printing. The fourth card carrying a debit balance operates in like manner as the value of this item is still not sufficient to change the character of the credit balance standing on the accumulator. The fifth card carries a debit item sufficient in value to change the character of the balance, that is, when its complement is entered there is no transferring action as a 9 remains on the left hand counter wheel. In this case as the debit card is analyzed, its designating perforation selects the debit balance accumulator for printing and as there is no subsequent transferring operation on the left hand counter wheel, the selection of the debit balance accumulator persists and if balance printing is effected after this entry, it will be printed from the debit balance accumulator in its true value representing a debit balance. The sixth card being another debit card should still select the debit accumulator for printing. The designating perforation shifts the printing connections temporarily selecting the credit accumulator but the ensuing transfer operates to reselect the debit balance accumulator which contains the true debit balance.

Briefly, then, the invention contemplates the selection of one of two amounts complementary to one another for printing under control of an entering mechanism, a transfer mechanism, or the joint control of both these mechanisms.

The invention is illustrated in the accompanying drawings in which.

Figure 1:
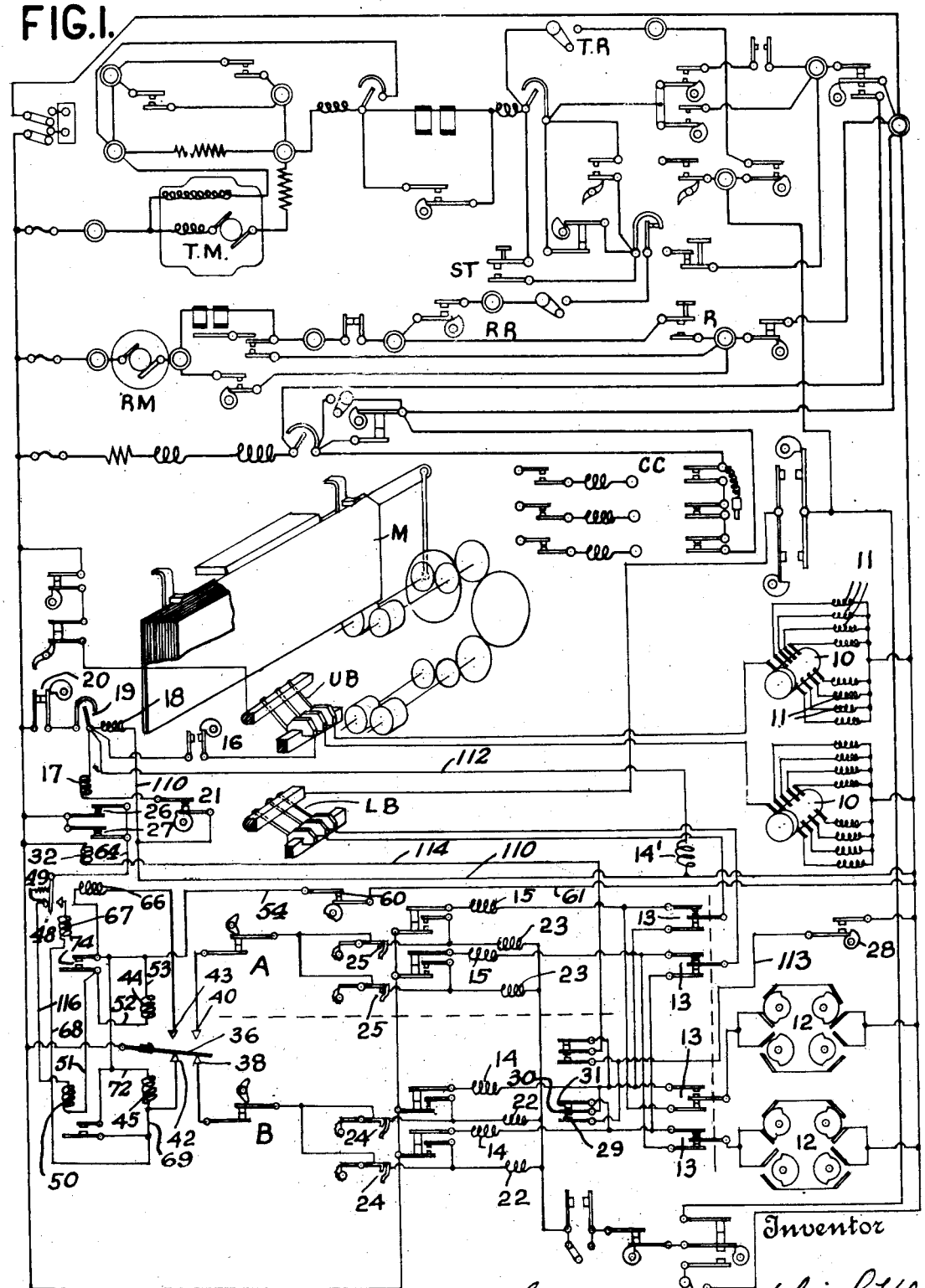
Fig. 1 is a complete circuit diagram for a subtracting tabulator showing the invention applied thereto.

Referring to Fig. 1, a tabulating motor TM is provided to operate the machine during accumulating operations. The tabulating motor is controlled through a plurality of circuits, contacts and relays indicated generally at TR, and when operated effects passage of tabulating cards, one at a time, from a magazine M causing them to pass beneath the upper or control analyzing brushes UB during one machine cycle and beneath the lower or adding analyzing brushes LB during the following machine cycle. The tabulating motor may be started into operation by closing start key contacts ST whereupon through the associated relays the tabulating motor continues to operate until a change of card group, if the machine is operating under the automatic control system indicated at CC, or until the cards are exhausted from the magazine if the machine is operating under straight control. At the end of a card group or tabulating run the tabulating motor TM ceases operation and total taking may be instituted by closing reset contacts R which cause the reset motor RM to start operation and drive the machine during total taking and reset. The reset motor is controlled by circuits, relays and contacts indicated generally at RR and ceases operation automatically after the total taking and reset operation is complete. The specific operation of the several circuits, contacts and relays is well known and fully described in the U. S. Patent granted to G. F. Daly et al, No. 1,762,145, June 10, 1930, and will not be described further herein.

The present tabulator is designed to subtract credit and debit items through mechanism fully described in the U. S. Patent No. 1,791,953, mentioned above. This machine operates from the usual Hollerith cards which are provided with ten index points in each column representing the ten digits and two extra index point positions which may be used for controlling. In the subtracting tabulator one of these extra controlling index point positions, to be hereinafter referred to as the X position, is used for indicating a debit item. That is, a card bearing a debit item is perforated in the X position while a card bearing a credit item is not. Two accumulating banks, designated A and B, are shown, of whch it will be assumed that bank A is to be used as a debit balance accumulator and the bank B as a credit balance accumulator. Through translating mechanism fully described in the Bryce Patent No. 1,791,953, each card as it passes the upper brushes UB is analyzed and its analysis through reading-in translator commutators 10 effects energization of different combinations of the magnets 11 according to the data carried by the card. The magnets 11 control shiftable brushes coacting with reading-out commutators 12 and during the following machine cycle when the card is passing the lower brushes LB the reading-out commutators 12 emit impulses corresponding to the complementary values of the data carried by the card. During this same cycle the lower brushes LB effect impulses corresponding to the actual value of the data. According to the scheme of operation of the machine each debit item is entered into the debit balance accumulator A in its true value and into the credit balance accumulator B in its complementary value, while each credit item is entered into the credit balance accumulator B in its true value and into the debit balance accumulator A in its complementary value.

The selection of the accumulators to receive the different classes of items is made by a plurality of relay contacts 13 consisting of groups of three, each group consisting of an upper and lower stationary contact and a middle shiftable contact normally in engagement with the lower contact but which upon energization of an associated relay coil 14′ shifts into engagement with the upper contact of its group.

With the contacts 13 in their normal position as shown in the drawings, the lower brushes LB are connected directly to the counter magnets 14 of credit balance accumulator B and the reading-out devices 12 of the translating mechanism are connected directly to the counter magnets 15 of the debit balance accumulator A. In this case then, the credit cards, which bear no perforation in the X position, will enter their data in their true value in accumulator B and in complementary value in accumulator A. When a debit card bearing a perforation in the X position of a selected column passes the upper brushes, a selected brush cooperating with this column on encountering the X perforation establishes a circuit through cam contacts 16, closed only in the X position, and a relay 18, thereby closing the contacts 19 of the latter. The energization of the relay 18 from the controlling brush is instantaneous but a stick circuit is provided through cam contacts 20 which close while the brushes are passing the X position and remain closed until just prior to the analyzing of the X position in the following cycle. This circuit extends from the left side of line through cam contacts 20, relay contacts 19 and relay coil 18 to the right side of the line. The relay 18 then, when once energized remains energized during the whole entering portion of the following machine cycle. Relay coil 14′ is in parallel with relay 18 and energized with it so that whenever a debit card passes the upper brushes the relay magnet 14′ is energized to shift the contacts 13 and hold them shifted during the following machine cycle. In this case the item from the card is entered from the lower brushes directly to the debit balance accumulator A in its true value and from the reading-out devices 12 into the credit accumulator B in complementary value.

Each counter magnet 14 has an associated printer magnet 22 and each conuter magnet 15 has an associated printer magnet 23. The printer magnets operate in the usual manner fully described in the above mentioned patent to Daly and Page, to print items and totals. Total printing is controlled through totaling contacts 24 for the accumulator B and totaling contacts 25 for the accumulator A, these totaling contacts being closed through suitably stepped cams which are connected to the accumulator wheels and positioned according to the data standing thereon. The totaling contacts serve to energize the printing magnets at the proper time in the total print cycle to select the type representing the totals standing on the accumulators for printing. As previously explained, it is desired to print only the true balance whether it be debit or credit. If it be a debit balance, the debit balance accumulator A must be selected for printing and if it be a credit balance, the credit balance accumulator B must be selected for printing. This selection is made through contacts 26 controlled from the analyzing brush which cooperates with the card column bearing the X perforations for debit cards and through contacts 27 controlled from the transfer mechanism of the extreme left hand wheel of the credit balance accumulator. The contacts 26 are normally open but are closed on energization of relay 17.

It will be recalled that the balance accumulators are selected for item entry at the end of the cycle during which the card is passing the upper brushes but that the entry is made during the following cycle. Obviously the total printing selection must be made during the cycle in which the last item entry occurs and the momentary energization of relay 17 which is to result from the passage of a debit card (having an X perforation) is delayed until the following machine cycle when the card is passing the lower brushes. The relay coil 17 is in parallel with coil 18 and its circuit is prepared at the time coil 18 is first energized but its circuit is actually closed through cam contacts 21 which are suitably timed to effect momentary energization of coil 17 during the cycle in which the debit card is passing the lower brushes.

The contacts 27 are closed instantaneously when the transfer mechanism of the extreme left hand wheel of the credit balance accumulator is operated. The transfer mechanism is of the electrical type fully described in U. S. Patent to Bryce No. 1,723,499, August 6, 1929. Briefly, this mechanism consists of cam controlled contacts 28 which close instantaneously to furnish a transfer impulse after the adding portion of each machine cycle. Each counter magnet 14 is provided with three contacts 29, 30 and 31 which are normally disengaged from each other. If any counter wheel passes through zero, its contacts 29 and 30 engage and remain closed until after the transfer impulse of contact 28 occurs. If any wheel stands at 9 at the end of an adding cycle, the contacts 30 and 31 are in engagement when the transfer impulse occurs. Each contact 29 is connected directly to the impulse contacts 28. The middle contacts 30 of all counter wheels except the one to the extreme left, are connected to the counter magnets 14 of the next higher denominational order and upper contacts 31 are connected to their associated counter magnets 14 as shown. The middle contact 30 of the counter element to the extreme left of the credit bank B is connected to a relay coil 32 controlling contacts 27 previously mentioned. With this arrangement, if there is a transfer from the counter wheel to the extreme left of the credit balance accumulator, the magnet 32 will receive the transfer impulse from contacts 28 in the same way that the counter magnets receive it from their lower denominational order. That is, if after the entry of a debit item, in its complementary value, on the credit balance accumulator, the left hand wheel of this accumulator transfers, indicating that the balance thereon does not change in character, the relay 32 will be energized to close contacts 27 instantaneously.

Figure 2:
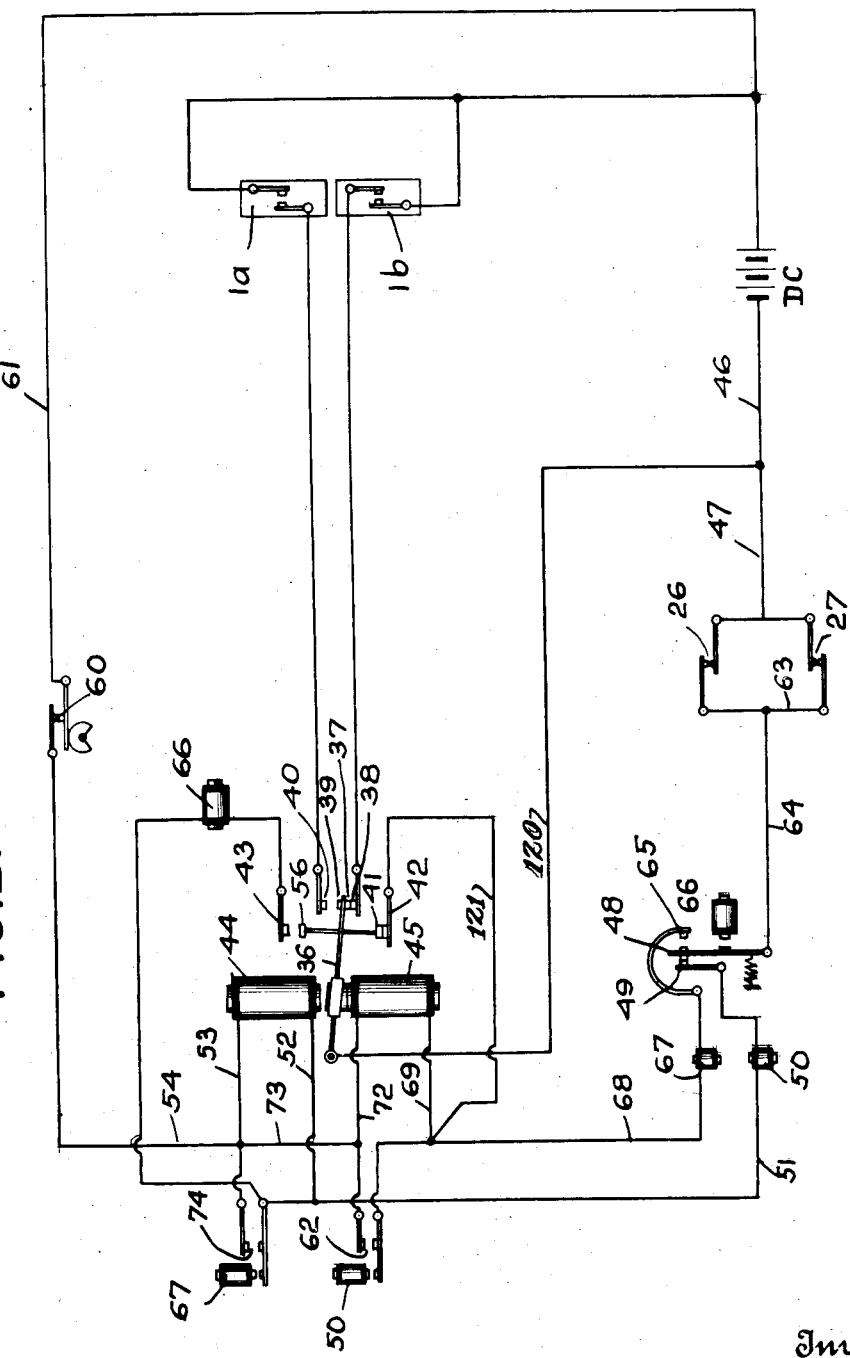
Fig. 2 is a schematic circuit diagram illustrating the invention in simplified form with the machine circuits not directly concerned with it omitted.

The operation of the printer selecting mechanism is more readily understandable from Fig. 2 in which the total printing selecting circuits are shown unconnected with the remaining circuits of the machine. The debit balance accumulator printing mechanism is indicated at 1a and the credit printer at 1b, these being selected for printing according to the presence of a true balance or complementary balance on the credit accumulator. The printing devices are selected by a shiftable armature 36 normally in the position shown, closing contacts 37—38 to select the credit printer 1b but shiftable to an alternative position to close contacts 39—40 to select the debit printer 1a. The armature 36 is controlled by magnets 44 and 45. If neither magnet is energized, the armature returns through gravity to its normal position and may be locked there by energization of magnet 45. It may be moved to its alternative position by deenergizing magnet 45 and energizing magnet 44. The magnets 44 and 45 are controlled by contacts 26, which are closed when a debit card bearing a designating perforation passes the analyzing brushes, and contacts 27 which are closed by a transferring operation from the extreme left hand denominational order of the credit accumulator as previously explained. The armature 36 when the magnet 45 is once energized also establishes a stick circuit for this magnet through contacts 41—42.

The stick circuit extends from source of power DC through wires 46 and 120 to armature 36, thence through contacts 41—42 and wires 121 and 69 to magnet coil 45, thence through wires 72, 73 and 54, cam contacts 60 and wire 61 back to the source DC.

Assume that the credit accumulator indicates a credit balance, indicated by zeros on its counter wheels to the left, and that a credit card (having no X perforation) passes the analyzing brushes. There will be no shifting of the transfer mechanism and the armature 36 remains in the position shown, still selecting the credit printer 1b. If a debit card bearing a designating X perforation passes the analyzing brushes, the contacts 26 close, establishing a circuit from source DC through wires 46, 47 and contacts 26 to back contacts 48 and 49 of a relay 66, thence through magnet 50, wires 51 and 52 to magnet 44, thence through wires 53 and 54, cam contacts 60 and wire 61 to the other side of the source DC.

Energization of magnet 50 closes contacts 62 shunting and deenergizing magnet 45, whereupon the energization of magnet 44 through the circuit just traced shifts the armature 36 opening contacts 37—38 and 41—42; closing contacts 39—40 to select the debit printer 1a for printing and closing contacts 43—56 to energize relay 66. The latter opens contacts 48—49 and closes contacts 48—65. Incidentally the closure of contacts 43—56 establishes a stick circuit for both relay 66 and magnet 44, this circuit extending from source DC to armature 36 and contacts 56—43, thence to relay coil 66 through wire 52 to magnet 44 and through wires 53, 54 and cam contacts 60 to the other side of source DC. If the debit item is sufficient to wipe out the credit balance, this fact being indicated by the presence of nines on the left hand wheels of the credit balance accumulator, no further action will take place and the debit printer 1a will remain selected for printing the balance. If the debit item is not sufficient to wipe out the previous credit balance, the nines will be transferred off the accumulator wheels to the left on the subsequent transferring operation and this transferring operation will close contacts 27 momentarily. The closure of these contacts establishes a circuit from source DC through wires 46 and 47 to contacts 27, thence through wires 63 and 64 to contacts 48—65, closed by energization of the magnet 66, thence through magnet 67, wires 68 and 69 to magnet 45 and through wires 72 and 73 to the other side of the source DC as before.

Energization of magnet 67 closes contacts 74 establishing a shunt about magnet 44 to deenergize it, whereupon energized magnet 45 attracts armature 36 back to its normal position closing contacts 37—38 to select the credit printer 1b for printing. Thus the passage of each debit card when the credit accumulator is selected normally selects the debit printer for operation. If a transfer occurs on the left hand counter wheel, the credit printer is re-selected, while if no transfer occurs, the debit printer remains selected.

If the debit balance accumulator stands selected at the beginning of an entering operation, magnet 44 and relay 66 will be energized through the stick circuits traced above. A debit entry in this case, on closing of contacts 26 establishes a circuit as follows: from source DC through contacts 26 and contacts 48—65, closed owing to energization of relay coil 66, thence through magnet 67, wires 68 and 69 to magnet 45 and through wires 72, 73 and 54 to contacts 60 to the other terminal of source DC. Contacts 74 close short circuiting and deenergizing magnet 44 whereupon armature 36 shifts to select the credit balance accumulator. When a debit entry is effected and there is a debit complementary balance on the credit accumulator a transfer always occurs from the extreme left hand counter wheel and the consequent closure of contacts 27 reselects the debit balance accumulator as will be clear from the prior explanation.

Contacts 60 are normally closed during successive entering operation and serve to hold the stick circuits over the end of the entering operations so that each selection persists to the next machine cycle. The contacts 60, which remain closed as long as the machine is operating to enter items into the accumulators, are opened momentarily by their cooperating cam towards the end of each total taking or balance printing cycle, thereby breaking the stick circuits. The armature 36 thereupon falls to normal position, to select the credit balance accumulator for printing, unless it happens to be in that position already. Thus the credit balance accumulator stands selected at the end of each total taking cycle.

The operation of the device will now be briefly summarized in connection with Fig. 1 of the drawings. An armature 36 as in the other figure is shown in position to select the credit accumulator B for total printing. As long as credit cards which have no X perforation pass through the machine, the armature 36 will remain in its normal or lower position and if a total is printed at any time the balance will be selected from the credit accumulator B. When a debit card with an X perforation passes the upper brushes UB its X perforation causes momentary energization of relay 18 which thereupon establishes a stick circuit for itself and also a circuit for magnet coil 14' which circuit persists during the entering portion of the following card cycle while the debit card is passing the lower brushes LB. The initial circuit for relay coil 18 extends from the left side of the line to and through the upper brushes UB, thence through cam contacts 16 (closed momentarily at the X index point position), relay coil 18 and wire 110 to the right side of the line. The energization of relay coil 18 closes its contacts 19, and establishes a stick circuit which extends from left side of line through cam contacts 20 and contacts 19 to relay coil 18 and thence as before to the right side of line. The closure of relay contacts 19 also closes a circuit for magnet coil 14' extending as follows: from left side of line through cam contacts 20, contacts 19 and wire 112 to magnet coil 14' and thence to right side of line. During this following cycle momentary closure of the cam contacts 21 energizes relay 17 closing contacts 26 and shifting armature 36 to select the debit balance accumulator A for total or balance printing. If the debit item which is entered is large enough to wipe out the previous credit balance on the accumulator, the armature 36 remains in this shifted position and on a total printing operation the balance will be printed from debit accumulator A. If, on the other hand, this debit item is too small in value to wipe out a previous credit balance, the resulting transfer from the left hand wheel of the credit balance accumulator energizes relay 32 momentarily closing contacts 27 which through the magnets 44 and 45 shift armature 36 back to its normal position to select the credit accumulator B for balance printing. The energizing circuit for relay 32 extends from right side of line through cam contacts 28 (which close momentarily to initiate the transfer impulse), thence through wire 113 and contacts 29—30 of the left hand accumulating element of the credit balance accumulator (these contacts being closed during the time when the transfer impulse occurs if the element has operated its transfer mechanism during its cycle), thence through wire 114 and relay coil 32 to the left side of line. Relay 32 in closing its contacts 27 closes a circuit as follows: from left side of line through contacts 27, wire 64, contacts 48—49 and wire 116 to relay coil 50, thence through wires 51 and 52 to magnet coil 44, and through wires 53 and 54, cam contacts 60 and wire 61 to the right side of line. It will be noted that the armature 36 regardless of its position at the beginning of a card cycle will remain in this position, or at least be shifted back to it, whenever both a debit item is entered on the credit accumulator in complementary value and this accumulator effects a transfer from its left hand counter wheel. Cam controlled contacts 60 are designed to remain closed during accumulating operations and during total printing operations but to open momentarily at the end of each total or balance printing operation to deenergize the balance selecting comprising the magnets 44 or 45 so that after a balance is printed the armature 36 will always return to its normal position as shown in the figures in position to select the credit accumulator for balance printing.

Figure 3:
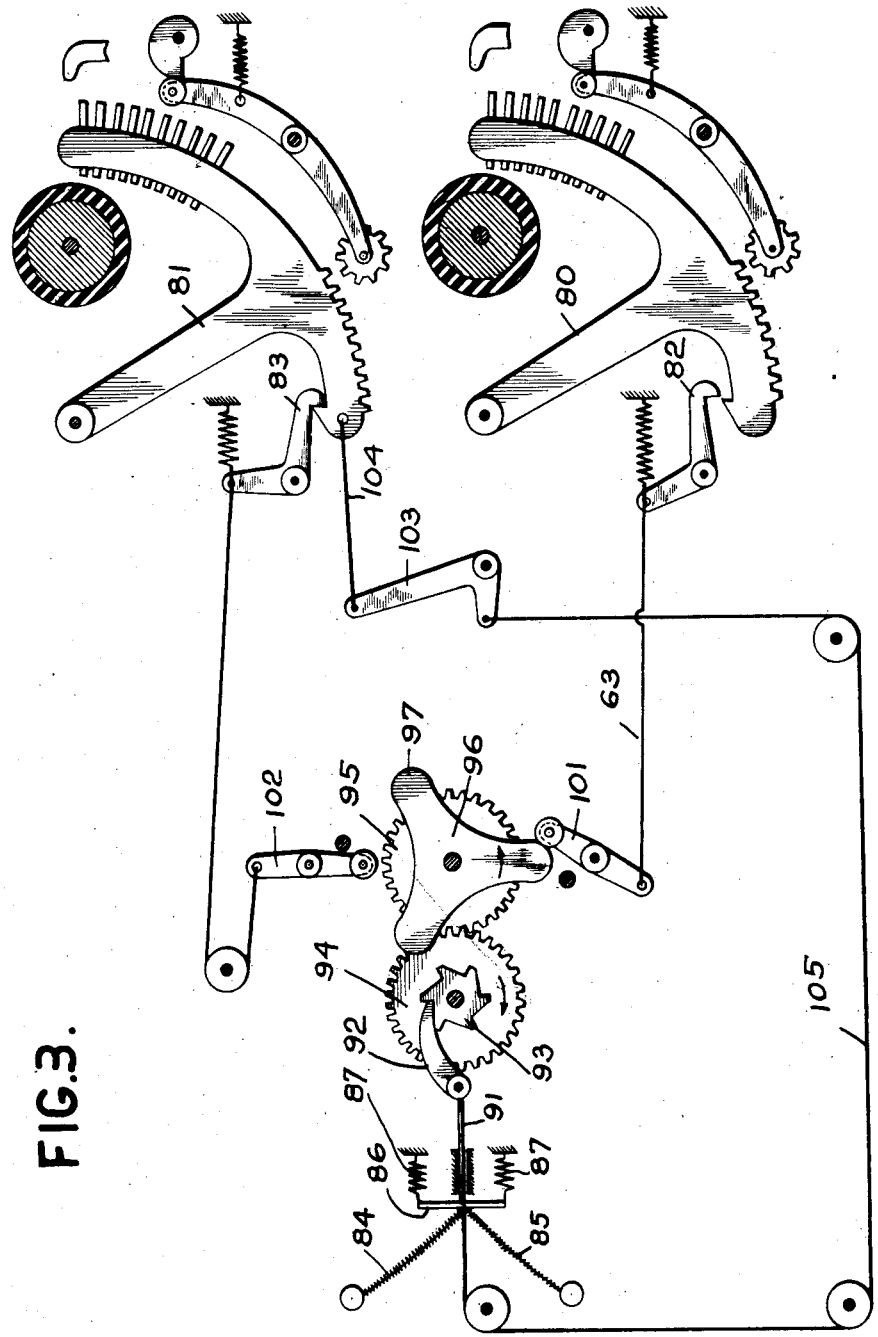
Fig. 3 is a modification illustrating how the invention may be practiced mechanically.

The invention may also be applied to a mechanically operated machine and a scheme is diagrammatically illustrated in Fig. 3 for doing so. In this figure a credit balance type sector is indicated at 80 and a debit balance type sector at 81. One of these is always in condition to print a balance and the other is always locked against operation through pawls 82 and 83, respectively, as will now be explained. Bowden wires 84 and 85 are shown connected to a common plate 86 which is urged by springs 87 to the right in the figure and may be pulled to the left by either Bowden wire 84 or 85. It may be considered that a pulling motion is given to the Bowden wire 84 whenever the analyzing mechanism of the machine encounters an X perforation on a debit card and that the Bowden wire 85 will be pulled to the left when transfer is effected from the left hand counter wheel of the credit balance accumulator. A connecting rod 91 is attached to the plate 86 and carries a pawl 92 coacting with a six toothed ratchet 93. A gear 94 is fixed to the ratchet 93 and meshes with a second gear 95 which is fast to a rotatable plate 96 having three nose-like extensions 97. The extensions 97 coact with pivoted levers 101 and 102 which through suitable wires are connected to the locking pawls 82 and 83 of the type carriers. An extension 97 of disc 96 is always in engagement with one of the levers 101 or 102 and the other lever is always free from such engagement. The lever which is engaged by an extension 97 rocks its corresponding pawl 82 or 83 out of locking position and permits the type bar 80 or 81 to operate. The latch associated with the other type bar is spring-pressed into locking position. In the figure the type bar 80 is released for balance printing while the type bar 81 is locked against such action. When a record card bearing a debit item carrying a perforation in its X position passes through the machine the Bowden wire 84 pulls the plate 86 to the left whereupon pawl 92 rides to the next tooth on ratchet 93 and on its return movement rotates the gear 94 and consequently the gear 95 one-sixth of a revolution. The plate 96 then releases lever 101 permitting latch 82 to engage credit balance printer 80 and another extension engages lever 102 to release latch 83 to permit balance printing by the debit balance printer 81.

If, in the same cycle, a transfer occurs from the left hand wheel of the credit balance accumulator the Bowden wire 85 is pulled to the left later in the cycle again operating the plate 86 and effecting rotation of the gears 94 and 95 through another sixth of a revolution whereupon lever 102 is released by the coacting extension 97 permitting relatching of the debit printer 81. Another extension 97 incidentally rocks lever 101 to release pawl 82 permitting balance printing from the credit printer 80. As in the other form, the machine normally should select the credit printer for balance printing. On each operation of the debit printer 81 a bell crank 103 attached to the type carrier through the wire 104 is rocked and the motion is transmitted to the plate 86 through a suitably guided wire 105. The plate 86 thereupon through pawl 92 effects another sixth of a revolution of plate 96 to cause latching of the debit type carrier 81 and release of the credit type carrier 80. It will thus be obvious that the mechanical device in its operation is entirely analogous to the electrical device previously described.

The invention has now been described in connection with several practical embodiments but it is to be understood that all of the mechanism shown should be considered in an exemplary sense and not in a limited one as many equivalents for all the mechanisms and even for the general system will readily occur to those skilled in the art.

What I claim is:

1. A record controlled accounting machine comprising a plurality of printing devices, total printing mechanism with means for calling the same into operation after the passage of different numbers of records through the machine and record controlled means for selecting one of the printing devices for possible total printing on the passage of each record through the machine.

2. A record controlled accounting machine comprising record controlled means for accumulating items on controlling records, a plurality of printing devices, total taking mechanism and means controlled by the records bearing items to be accumulated for selecting one of the printing devices for total printing on operation of said total taking mechanism.

3. A record controlled accounting machine comprising an accumulator provided with transfer mechanism, a plurality of printing devices and means controlled conjointly by the transfer mechanism and controlling records for selecting the several printing devices for printing.

4. A record controlled accounting machine comprising an accumulator provided with transfer mechanism, a plurality of printing devices, total taking mechanism and means controlled conjointly by said transfer mechanism and controlling records for selecting the several printing devices for printing on operation of said total taking mechanism.

5. An accounting machine comprising a debit balance accumulator, a credit balance accumulator and entering means for selectively entering debit and credit items into their proper accumulators, balance printing mechanism and means for selecting the balance printing mechanism for subsequent operation on the entry of the several kinds of items into the accumulators.

6. An accounting machine comprising a debit balance accumulator, a credit balance accumulator and entering means for selectively entering debit and credit items into their proper accumulators, balance printing mechanism with provisions for selectively printing debit and credit balances from the accumulators and means controlled by the entering means on each entry of one type of item for selecting the balance printing mechanism for subsequent operation to print a balance corresponding to that type of item.

7. An accounting machine comprising a debit balance accumulator, a credit balance accumulator and entering means for selectively entering debit and credit items into their proper accumulators, balance printing mechanism with provisions for selectively printing debit and credit balances from the accumulators, means controlled by the entering means on each entry of one type of item for selecting the balance printing mechanism for subsequent operation to print a balance corresponding to that type of item and means controlled by the accumulators for selecting the balance printing mechanism for subsequent operation to print a balance corresponding to the other type of item.

8. An accounting machine comprising a debit balance accumulator, a credit balance accumulator and entering means for selective entering debit and credit items into their proper accumulators, balance printing mechanism with provisions for selectively printing debit and credit balances from the accumulators, means controlled by the entering mechanism on each entry of one type of item for selecting the balance printing mechanism for subsequent operation to print a balance corresponding to that type of item and means controlled by the accumulators according to the comparative aggregate values of the different kinds of items entered to select the balance printing mechanism for subsequent operation to print a balance corresponding to the other type of item.

9. An accounting machine comprising a debit balance accumulator, a credit balance accumulator and entering means for selectively entering debit and credit items into their proper accumulators, balance printing mechanism with provisions for selectively printing debit and credit balances from the accumulators, means controlled by the entering mechanism on each entry of one type of item for selecting the balance printing mechanism for subsequent operation to print a balance corresponding to that type of item and means controlled by the accumulators according to the comparative aggregate values of the different kinds of items after each item entry to select the balance corresponding to the other type of item.

10. An accounting machine comprising balance accumulator mechanism and means for entering one type of items therein in their true value and another type of items therein in their complementary value to effect subtraction, printing mechanism with provisions for printing two types of balances corresponding to the items according to the reading of the accumulator mechanism, means controlled by the entering means on entry of each item of one type for selecting the printing mechanism for subsequent operation to print a balance corresponding to that type and means controlled by the accumulator according to a change in the nature of the balance indicated thereby to select the printing mechanism for subsequent operation to print a balance corresponding to the other type of item.

11. An accounting machine comprising balance accumulator mechanism and means for entering one type of items therein in their true value and another type of items therein in their complementary value to effect substraction, printing mechanism with provisions for printing two types of balances corresponding to the items according to the reading of the accumulator mechanism, means controlled by the entering means on each complementary entry to select the printing mechanism for subsequent operation to print a balance corresponding to one type of items and means controlled by the accumulator on a change from a complementary to a true reading to select the printing mechanism for subsequent operation to print a balance of the other type.

12. An accounting machine comprising balance accumulator mechanism and means for entering one type of items therein in their true value and another type of items in their complementary value to effect subtraction, printing mechanism with provisions for printing two types of balances corresponding to the items according to the reading of the accumulator mechanism, selecting means for alternately selecting the printing mechanism to print the two types of balances and controlling means for said selecting means operated by the entering means on entry of one type of item and by the accumulator mechanism on a change in the nature of the balance thereon.

13. An accounting machine comprising balance accumulator mechanism and means for entering one type of items therein in their true value and another type of items therein in their complementary value to effect subtraction, printing mechanism with provisions for printing two types of balances corresponding to the two types of items according to the reading of the accumulator mechanism, selecting means for alternately selecting the printing mechanism to print the two types of balances and controlling means for said selecting means operated by the entering means on entry of the complementary value of an item and by the accumulator on a change from a complementary to a true balance thereon.

14. An accounting machine comprising balance accumulator mechanism and means for entering one type of items therein in their true value and another type of items in their complementary value to effect subtraction, printing mechanism with provisions for printing balances corresponding to the two types of items according to the reading of the accumulating mechanism, selecting means for alternately selecting the printing mechanism to print the two types of balances and controlling means for said selecting means operated by the entering means on entry of the complementary value of an item and by the accumulator mechanism on a transferring operation from a predetermined denominational order.

15. A record controlled accounting machine comprising record analyzing means, balance accumulator mechanism controlled by the analyzing means for receiving true or complementary values of items according to a designating index point on a record, printing mechanism with provisions for printing two types of balances corresponding to the true value of a true or complementary balance on the accumulator mechanism, selecting means for alternately selecting said printing mechanism to print the two types of balances and controlling means for said selecting means controlled by the analyzing means on encountering a designating index point and by the accumulator mechanism on a transferring operation from a predetermined denominational order.

16. A record controlled accounting machine comprising record analyzing means, balance accumulator mechanism controlled by the analyzing means for receiving true or complementary values of items according to a designating index point on a record, a pair of printing devices, one for printing true balances corresponding to true balances on the accumulator mechanism and the other for printing true balances corresponding to complementary balances on the accumulator mechanism, selective means for alternately selecting said printing devices for printing and operating means for the selective means controlled by the analyzing means on encountering a designating index point and by the accumulator mechanism on a change in the nature of a balance thereon.

17. A record controlled accounting machine comprising record analyzing means, balance accumulator mechanism controlled by the analyzing means for receiving true or complementary values of items according to a designating index point on a record, a pair of printing devices, one for printing true balances corresponding to true balances on the accumulator mechanism and the other for printing true balances corresponding to complementary balances on the accumulator mechanism, selective means for alternately selecting said printing devices for printing and operating means for the selective means controlled by the analyzing means on encountering a designating index point and by the accumulator mechanism on a transferring operation from a predetermined denominational order.

18. In a record controlled accounting machine, a record analyzing means, accumulator mechanism controlled by said analyzing means, a transfer mechanism for the accumulator mechanism, a plurality of total printing devices and means controlled by said transfer mechanism for selecting one of the printing devices for printing.

ULRICH KÖLM.